United States Patent [19]

Best

[11] 3,948,313

[45] *Apr. 6, 1976

[54] ARRANGEMENT TO CONTROL HEAT FLOW BETWEEN A MEMBER AND ITS ENVIRONMENT

[75] Inventor: John S. Best, Midland, Mich.

[73] Assignee: The Dow Chemical Company, Midland, Mich.

[ * ] Notice: The portion of the term of this patent subsequent to Oct. 30, 1990, has been disclaimed.

[22] Filed: Feb. 9, 1973

[21] Appl. No.: 331,089

Related U.S. Application Data

[63] Continuation of Ser. No. 112,636, Feb. 4, 1971, Pat. No. 3,768,547.

[52] U.S. Cl. ............... 165/45; 165/104 S; 138/105; 61/36 A; 166/DIG. 1
[51] Int. Cl.² .................... F28D 21/00; E21B 43/24
[58] Field of Search ............. 165/45, 104; 138/105; 61/36 R, 36 A; 166/DIG. 1

[56] References Cited
UNITED STATES PATENTS

| | | | |
|---|---|---|---|
| 3,472,314 | 10/1969 | Balch | 165/45 X |
| 3,564,862 | 2/1971 | Hashemi et al. | 165/45 X |
| 3,613,792 | 10/1971 | Hyde et al. | 166/DIG. 1 X |
| 3,650,119 | 3/1972 | Sparling | 61/36 A X |
| 3,650,327 | 3/1972 | Burnside | 166/DIG. 1 X |
| 3,662,832 | 5/1972 | Keeler et al. | 166/DIG. 1 X |
| 3,721,298 | 3/1973 | Corbett et al. | 166/DIG. 1 X |
| 3,749,163 | 7/1973 | Waters | 165/45 X |

*Primary Examiner*—Albert W. Davis, Jr.
*Attorney, Agent, or Firm*—Lloyd E. Hessenaur

[57] ABSTRACT

An arrangement of insulating, thermal absorbing and/or dissipating elements controlling heat flow between a member and its environment. In certain permafrost environments, for example, one or more elements of the system can include a heat sink and/or a thermal bleed where the member is heated. The arrangement controls heat flow from a heated member at such a rate that the total heat transfer does not exceed the limits of the residual heat capacity of permafrost below the freezing point thereof during cyclic climatic influences. The arrangement takes advantage of the fact that artificial heat from the heated member can be controlled, while natural solar heat is balanced by the seasons. The elements also serve to maintain relatively stable temperature differentials between heated or cryogenic materials and their adjacent ground support, so there is a minimal effect of one on the other.

10 Claims, 18 Drawing Figures

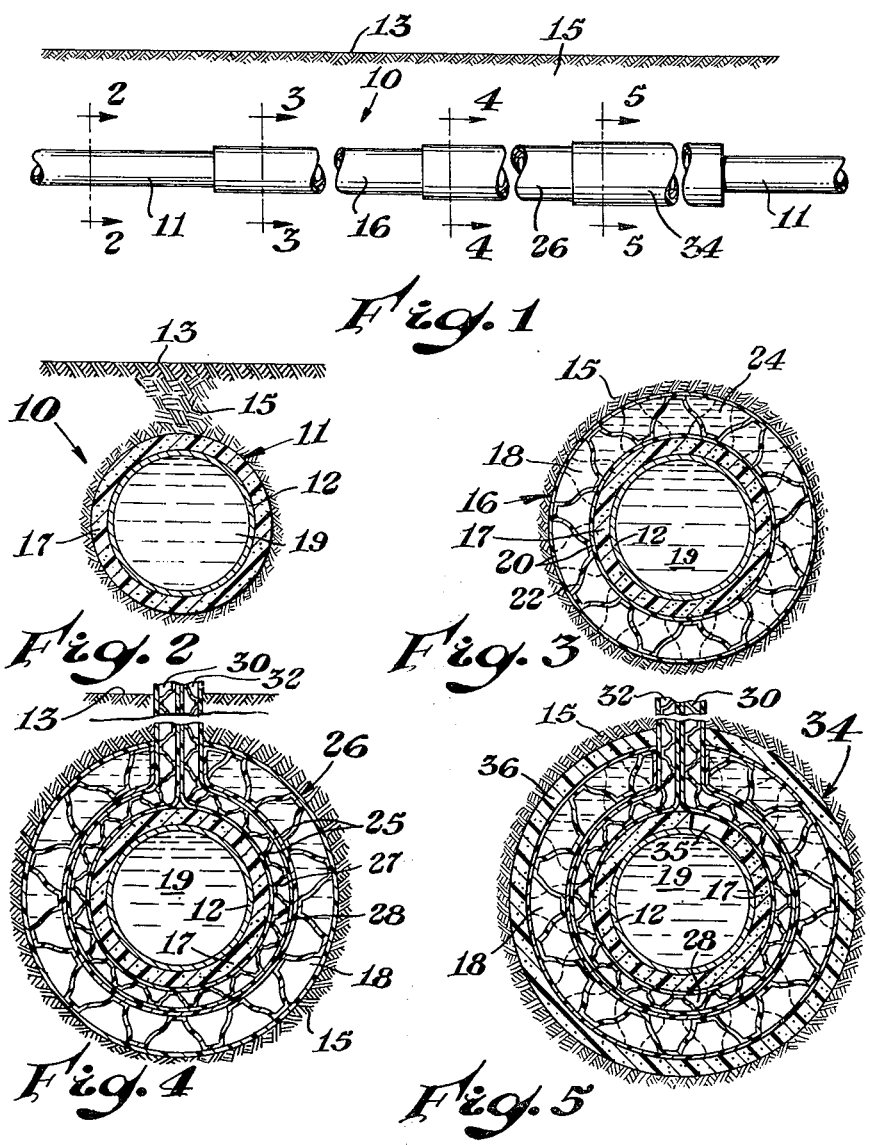

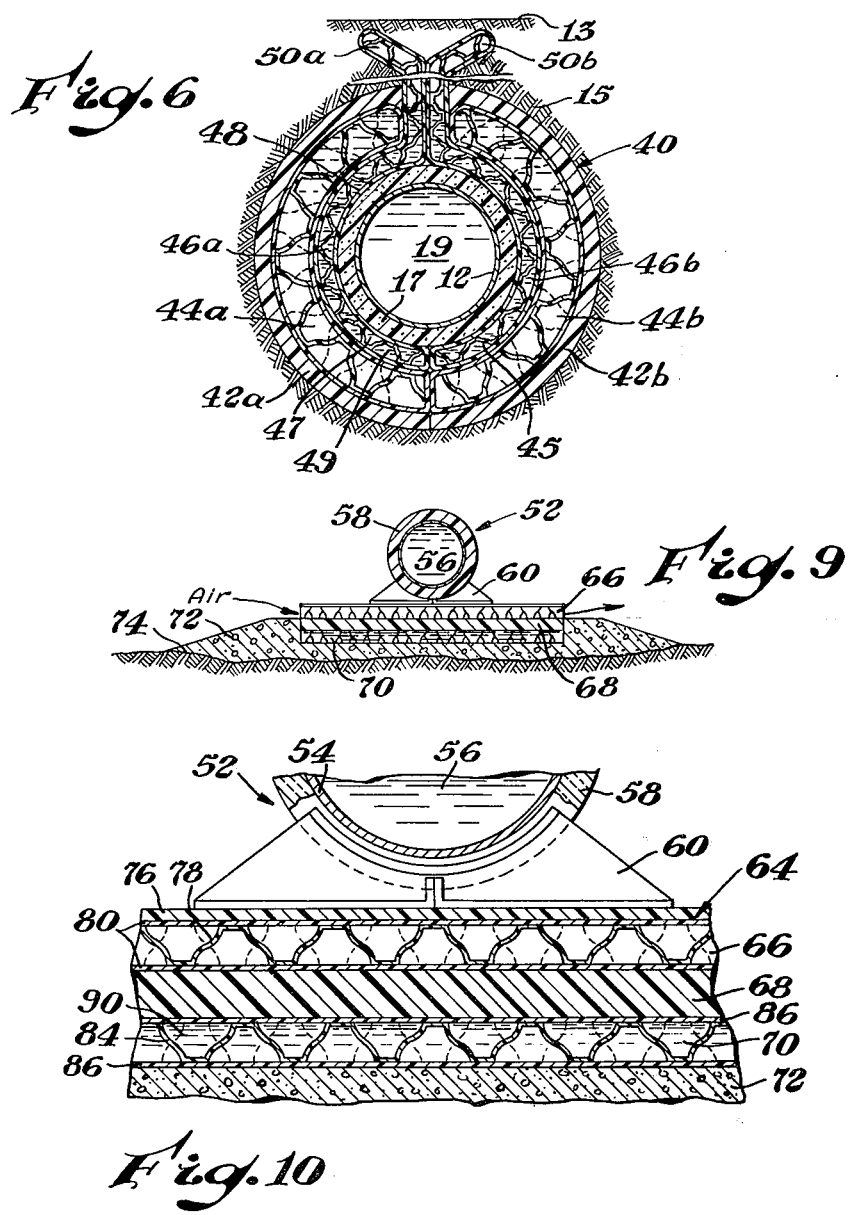

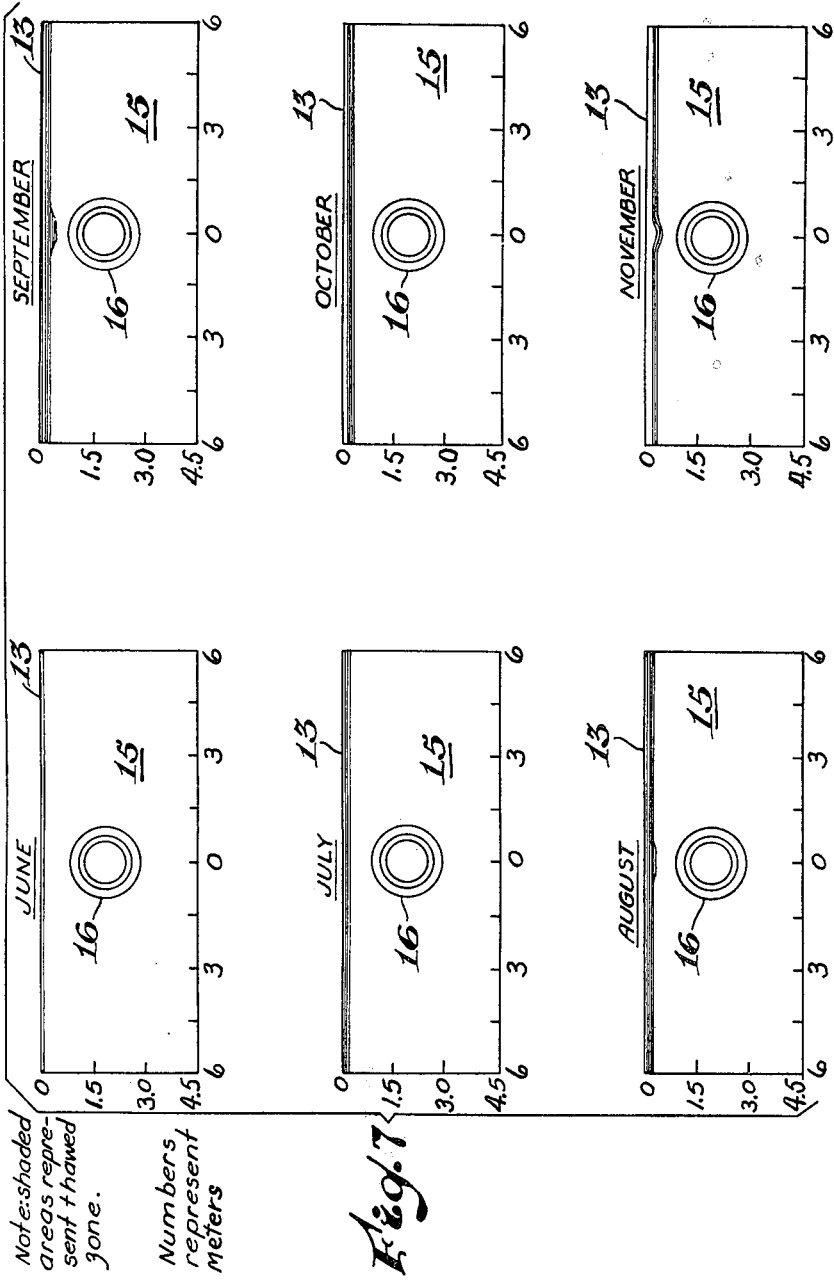

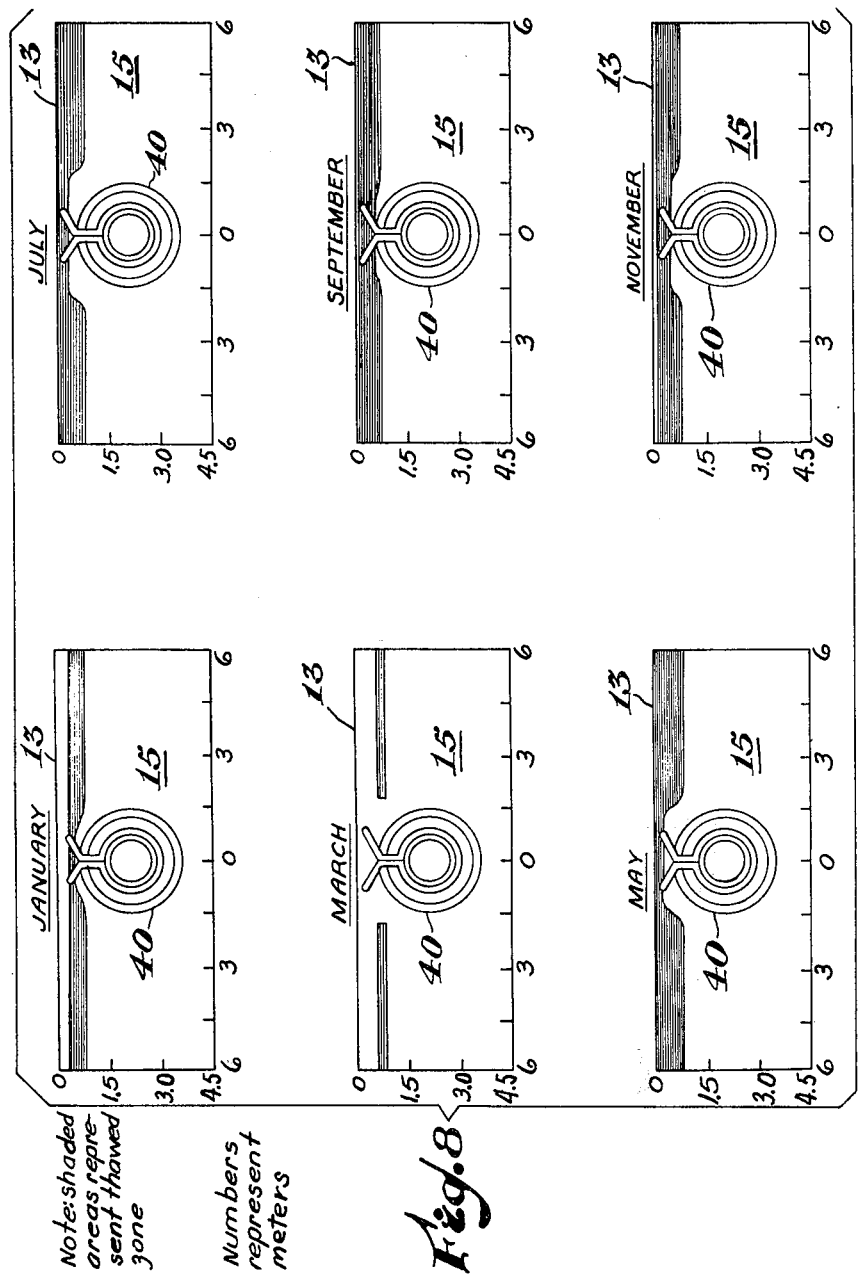

ARRANGEMENT TO CONTROL HEAT FLOW BETWEEN A MEMBER AND ITS ENVIRONMENT

This is a continuation of application Ser. No. 112,636 filed Feb. 4, 1971, now U.S. Pat. No. 3,768,347 granted Oct. 30, 1973.

This invention concerns an arrangement of elements for controlling heat flow between a member and its environment. For example, there has been a problem of providing adequate thermal protection for heated members, such as an oil pipeline or building structures, in Arctic regions where undue melting of the permafrost could have a major impact on the stability of the environment and possibly the security of such heated members. By heated members, or fluids and the like is meant members, fluid, or the like at a temperature greater than that of the adjacent ground support. It is known that a heated pipeline, through thermal dissipation, will cause a constant and continuous thawing and degradation of its adjacent supporting permafrost ground. In the particular case of an oil pipeline, since support for the pipeline must find its foundation within or on such ground, disruption of the permafrost support can directly result in rupture of the line and spillage of heated oil, or other heated fluids, which might be present in such a line resulting in even more disruption of the permafrost. Further than this, spillage of such fluids in any significant quantity can cause untold pollution of the surrounding environment. Where heated buildings cause melting of the permafrost, severe settlement of the buildings due to loss of support can cause undue damage to the structures.

In some instances, just locating an insulating layer, such as a closed cell plastic foam or its thermal equivalent, between the heated member and the permafrost, might be adequate if thick enough and in an area where the mean annual temperature is very low, as for example 10°F. at the North slope of Alaska. However, where the heat sink capacity of the surrounding ground is significantly less than found in this area, such an insulation layer is not adequate to keep the heated member from affecting and deteriorating the permafrost upon which it is supported.

Also found to be a problem has been the excess heat which can be generated by flow friction of a fluid through a pipeline or the like, it being preferable to keep the temperature of the fluid relatively constant.

Where cryogenic fluids are carried in a pipeline, or in other cryogenic applications, yet other problems arise, it being essential that the temperature of the fluid within the line be affected as little as possible by the surrounding supporting earth, be it permafrost or otherwise. Fluctuations in the temperature interface between such a line and its surrounding support can result in many practical problems.

Accordingly, it is among the objects of the present invention to provide an arrangement of insulating, thermal absorbing and/or dissipating elements in the proximity of a heated member which acts as a thermal protection system for permafrost supporting the heated member. It is another object to provide such an arrangement which relies on the fact that artificial heat from the heated member can be controlled, and natural solar heat is balanced by the seasons.

Yet another object of the present invention is to find a satisfactory system for dumping excess heat generated by fluid flow friction. Still another object of the present invention is to minimize the effect of the surrounding environment on cryogenic materials supported within said environment.

Briefly, the present invention comtemplates various combinations of insulating, thermal absorbing and/or dissipating elements to take care of heated members in environments having varying thawing indexes, as for example, from the North slope of Alaska having a mean annual temperature of about 10°F. to Valdez, Alaska, having a mean annual temperature of about 32°F. The combination of elements can include plastic foam or equivalent insulation adjacent the heated member and, in combination therewith, a heat sink and/or a ventilating or thermal absorbing cell, the latter allowing free air passage or its equivalent between other elements in the system. The heated member, such as a pipeline carrying oil or the like at a temperature significantly above that of the adjacent earth, can be located below or above the ground and employ the arrangement of insulating, thermal absorbing and/or dissipating elements which is contemplated hereby. Combinations of such insulating and thermal absorbing and/or dissipating elements can be used effectively in supporting other heated members, such as heated buildings and the like on permafrost. Bleeding of excess heat from members can also be affected by such elements. Such elements can also act to maintain a relatively stable temperature differential between cryogenic materials and the supporting earth; and generally to control heat flow between a member and its environment.

Yet additional objects and advantages of the present invention are even more apparent when taken in conjunction with the accompanying drawing in which like characters of reference designate corresponding material and parts throughtout the several views thereof, in which:

FIG. 1 illustrates an underground pipeline, with portions broken away, running through a permafrost region either continuously or only in sections where circumstances dictate, and extending left to right from an extremely cold region to a generally milder region;

FIGS. 2–5 illustrate in partially exaggerated cross section various arrangements of insulating, thermal dissipating and/or absorbing elements for different situations encountered in various permafrost regions taken along lines 2—2 through 5—5 of FIG. 1;

FIG. 6 is a view like FIG. 5 only showing a modified version thereof;

FIG. 7 is a graphical representation of thaw penetration where a section that of FIG. 3 is employed;

FIG. 8 is a view like FIG. 7 but where a section like that of FIG. 6 is employed;

FIG. 9 is a modified form of the invention showing in cross-section a heated member located above ground in a permafrost region;

FIG. 10 is an enlarged view of the insulating, thermal dissipating and/or absorbing elements of FIG. 9;

Figure 15:
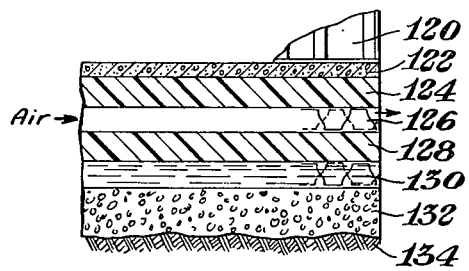
Figure 17:
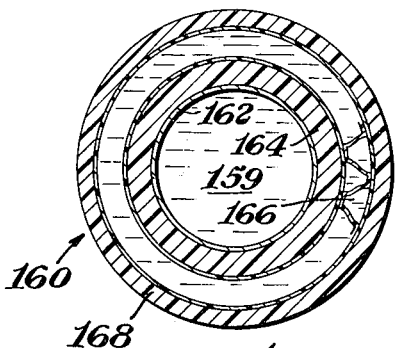
Figure 16:
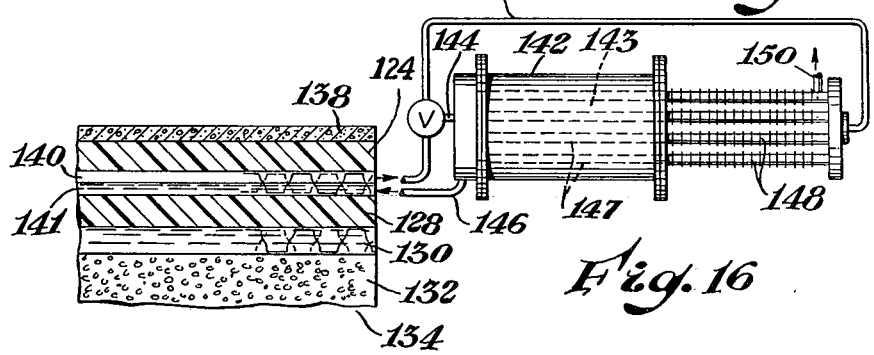
Figure 18:
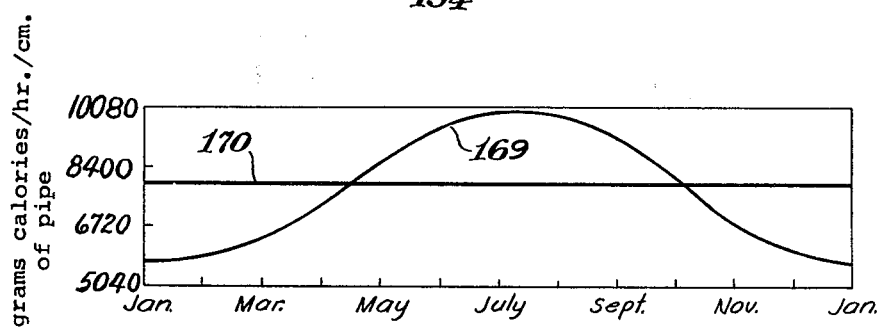

FIGS. 11 through 14 illustrated in partially exaggeratd cross-section various modified arrangements of the present invention all incorporating a thermal bleed immediately adjacent a heated member; the portions of the core not illustrated for convenience only, but intended to be included;

FIG. 15 is a modified form of the invention showing in cross-section a building structure as a heated member located in a permafrost region;

FIG. 16 is a view like FIG. 15 only showing yet another modified version of a building structure employing the concepts of the present invention;

FIG. 17 illustrates a partially exaggerated cross-section of an underground pipeline which pipeline carries a cryogenic fluid and is adapted to be located in adjacent earth which is at a substantially higher temperature than that of the cryogenic fluid; and FIG. 18 is a graphic representation of an interface effect on the pipeline of FIG. 17 because of elements of this invention as compared to prior art concepts.

In order to describe the invention in some detail, a specific embodiment thereof is illustrated in FIGS. 1 to 5, which represents an oil pipeline 10 extending from the North slope of Alaska having a mean annual temperature of about 10°F. and an air freezing index of about 8500 degree-days each year, to Valdez, Alaska having a mean annual temperature of about 32°F. and an air freezing index of about 3,000 degree-days per year. A "degree-day" as used herein represents one day with a mean air temperature one degree below or above freezing. The "freezing index" merely represents the number of degree days below freezing during a year and is commonly used to calculate the depth of ground freezing during the winter. The "thawing index" on the other hand, is merely the number of degree days above freezing during a year. For example, a freezing index of 10 degree-days may result when the mean air temperature is 31°F. for 10 days or when the mean air temperature is 22°F. for 1 day.

It should be appreciated that in the following description of the pipeline 10, specific details are shown to describe a preferred embodiment for a particular permafrost region and situation, and that the concept of then invention is equally applicable to other permafrost situations and lines carrying other fluids, gases as well as liquids, at temperatures above the transition temperature of the adjacent earth, about 32°F. or greater, and that the specific details of both the structure and its location may vary accordingly and still be within the concept of the invention as claimed. By "permafrost" is generally meant soil, rock tundra or other ground or earthen material which is frozen in the winter and which does not completely thaw out during the warmer seasons. Other explanations of permafrost can be found such as in the "Environmental Atlas of Alaska" by P. R. Johnson and C. W. Hartman, published 1969 by Institute of Water Resources, University of Alaska. A "permafrost region" is where permafrost occurs.

In the specific embodiments of FIGS. 1 to 6, 9 and 10 the following situation exists:

a. Pipeline 10 includes standard 48 inches diameter steel oil pipe 12 having a ½ to ¾ inch wall thickness;

b. The pipeline is located underground so that the centerline of pipe 12 is about six feet below surface 13 of the permafrost soil 15;

c. Hot crude oil at a temperature of about 180°F. is the fluid 19 carried by the pipe 12.

Referring now more particularly to FIGS. 1 and 2, pipeline section 11 comprises pipe 12 surrounded about its circumference by insulating layer 17. The insulation layer 17 can be a closed cell urethane foam, or its functional equivalent, having a "k" factor of about 0.24 BTU/ft$^2$/hr/°F/in. thk., and is about 4 inches in thickness. For example, a styrene maleic anhydride foam could be used as it has good solvent resistance to hydrocarbons. The environement for which this pipeline is adapted can be one such as is found on the North slope of Alaska wherein there is a mean annual temperature of about 10°F., the air freezing index being approximately 8500 degree-days each year, and the air thawing index being about only 500 degree-days per year. Since in this location the conductance and volumetric heat capacity of the permafrost below the thawing temperature is so large insulating of the type described is adequate to prevent any significant disruption of the permafrost layer due to the heat dissipated from the hot oil 19 in the pipeline through the insulation layer 17. However, even in this region, if the water content of the soil is too great, and/or does not have sufficient structural integrity it may be necessary to employ a pipeline section 16 as described hereinafter.

Heat absorbing and/or dissipating elements are added to the insulation system, as shown in pipeline section 16 of FIG. 3, to meet conditions found in Alaska south of the North slope as, for example, at the 66°N. Latitude which has a mean annual temperature of about 15°F. Here the air freezing index is somewhere between 6500 to 7000 degree-days F. and the air thawing index is around 2500 degree-days F. The pipeline section 16 is the same as that pipeline section 11 previously described only with a closed annulas heat sink in the form of a thermocell or heat sink 18 being located about insulation layer 17. The thermocell can comprise various configurations for containing or enveloping a heat sink material. The embodiment of thermocell 18 comprises inner and outer cylindrical skins 20 secured on opposite nodular ends of a core structure 22; which core structure, for example, can have a shape such as that shown in U.S. Pat. No. 3,277,598. The core structure primarily is one which separates the two skins and permits of fluid flow therethrough and, as such, can also be of bent corrugated metal, a granular or other particulate fill or other configurations and various materials such as also taught in U.S. Pat. No. 3,086,899 and 3,190,142, for example, The member containing the heat sink material should have sufficient impermeability to contain the heat sink material in its fluid state so that substantially none is lost in such state. The skins 20 can be adhered by adhesives, welded, heat sealed, or otherwise secured with the core 22. The thermocell can be made of a plastic material such as polyethylene or rubber modified polystyrene, but can be formed of other polymeric metallic, organic or other synthetic or natural substances having sufficient strength and impermeability to satisfy the requirements of such a thermocell. A liquid 24 enclosed within the thermocell 18 can be a saline, glycol or other solution sufficient to give the thermocell heat sink a freezing point slightly less than the transition temperature of the surrounding permafrost (usually about 32°C.) as, for example, 30°F. The liquid 24 incorporates a freezing point suppressant in water that in solution acts in a eutectic manner in the range of temperatures below 32°F. One such material can be a frozen solution containing less than 5 percent sodium sulfate. Specifically, a 3.84 percent solution by weight of sodium sulfate in water has a freezing point of approximately 30°F. Likewise, a 1 percent propylene glycol solution, by weight, has a freezing point of approximately 30°F. When the liquid is frozen, the heat required to melt the solution is great. The total heat of fusion of the sodium solfate solution, for example, is available within a few degrees below 32°F., thus, allowing reverse cycling of heat flow at less than 32°F. but stopping heat flow at heat source temperatures above 32°F. The heat sink in this particular instance had a thickness of about twelve inches from skin to skin and is substantially filled with liquid 24. In designing the thermocell 18 care should be taken to allow for expansion and contraction of the liquid 24 as the temperature changes.

The presence of the heat sink 18 substantially eliminates flucuations of the heat loss from the pipe 12. Thus, the underground pipeline 16 is kept in a near constant temperature environment thereby reducing the expansion and contraction effects, and therefore the need for expansion and contraction joints in the pipeline.

The presence of the heat sink around an insulated pipe buried in permafrost will increase the amount of heat transferred from the pipe to the soil over a one year cycle. By controlling the heat transfer from the pipe to the soil such that the permafrost is not thawed, the available seasonal low temperature of the air during the winter cycle is more effectively utilized. The sink system keeps the permafrost in the frozen state throughout the year and the latent heat of fusion of the water in the soil is not required. The heat exchange between the pipe and the atmospheric air is maximized since the permafrost is not allowed to go through the thawing and freezing cycle. The net result is that the average effective temperature differential is greater, therefore more heat can be dissipated.

For a milder area such as might be found at Fairbanks, Alaska, for example, which has a mean annual temperature of about 25°F., a modified insulated pipe section 26 such as shown in FIG. 4 can be employed. Here the freezing index is about 5500 degree-days F. and the thawing index is about 3000 degree-days F. The insulated pipe section 26 is like the pipe line section 16 only in between the insulation layer 17 and the thermocell 18 is formed a ventilating annulus or thermal bleed 28 to permit air circulation between the two. Since the amount of thawing which the permafrost experience is greater here than at the colder latitudes, the thermocell 18 need not be designed so that it alone is adequate to prevent significant thawing of the adjacent permafrost soil due to the hot oil 19 in the pipe line 10. Of course, one could increase the size of the thermocell to satisfy the additional demands made by the warmer climate. However, it is found more effective, practical and economical to provide ventilation in the form of air duct or annulus 27. This is not to say, however, that air is the only method that can be used to transfer the heat flow through the insulation layer to the atmosphere, as will be seen in the modification of FIG. 6 described hereinafter. To take additional heat from the pipe section 26 out to the atmosphere and to ease the load upon the thermocell 18, the annulus 28 can have a structure not unlike that of the thermocell 18, that is, having skins 25 like skins 20 and core structure 27 like core structure 22 secured together in a similar manner, only at one end thereof, preferably the upper end so as to have the least effect on the soil, providing an inlet 30 and outlet 32, which can be reversed from that shown, whereby air from the atmosphere can have passage therethrough. In certain integral constructions, it may be possible for the thermocell 18 and annulus 28 to share a common skin. The core is designed so that through passageways are a natural result of construction. It has been found that a bleed off of this nature can remove from about 50 to 100 BTUs per hour per lineal foot of pipe section 26 located at Fairbanks, Alaska.

During the summer there is the natural flow of heat from the adjacent soil to thermocell 18 which means the thermocell 18 will have to have enough capacity to absorb this heat and store it while remaining at 30°F. and therefore not effect the permafrost in the adjacent area. Thermocell 18 also has to have enough capacity to handle warm air coming through annulus 28. In permafrost regions the heat absorbed by the thermocell 18 during the summer can be dissipated during the winter. In the winter the annulus 28 is removing heat from the thermocell 18 as well as from heat passing through insulation layers from the pipe. Likewise in the winter, the thermocell 18 is losing heat through the soil to the atmosphere. Thus thermocell 18 is primarily needed for the summer months to store both the artificial heat from the pipeline and natural solar heat at 32°F. or less until such heat can be dissipated during the winter months.

In achieving stabilization of the permafrost the invention thus takes into account both artificial heat, i.e., the heat from the product being carried in the pipeline, and natural heat, i.e., solar radiation penetrating the soil. It recognizes that artificial heat can be controlled. That is, one can insulate the heated pipe and can use a heat sink or a ventilating or radiating annulus to absorb and dissipate the artificial heat until the atmospheric temperature cools enough, at which time the accumulated heat can be dumped. The arrangement also recognizes that the natural heat source is balanced by the seasons. Thus, the natural heat source varies between hot (generally above 32°F.) and cold (generally 32°F. or less) while the artificial heat source is continuously hot. Natural heat source thaws from the top of the permafrost soild downward while the artificial heat source thaws from within the permafrost outward. In accomplishing stabilization of the permafrost the invention uses both energy absorption and energy transfer. It is thus recognized that the entire job for a greatly varying permafrost region cannot be satisfactorily accomplished with insulation alone or even necessarily together with a heat sink at all locations. But with a combination of these elements, together with added elements, such as an annulus, where necessary a practical balance providing a protective arrangement in all permafrost regions is achieved. This is further exemplified by the other sections described hereinafter.

At warmer locations, as for example, as found at 64°N. latitude in Alaska where there is a mean annual temperature of about 27°F. with a freezing index of about 4000 to 4500 degree-days F. and a thawing index of about 3000 degree-days F., more insulation is required as illustrated for the pipeline section 34 of FIG. 5. Pipeline section 34 is like previously described pipeline section 26 only with an added insulating foam layer 36 about the outer circumference of the thermocell 18, the insulation layer 36 being of the same type and having properties like that of the insulation layer 17. This is a preferred combination of insulation and heat dissipating elements to prevent significant thawing of permafrost in an economical structure of this somewhat milder permafrost region.

Pipeline section 34 functions in the same manner as pipeline 26, but instead of having a thermocell forming a heat sink of a depressed temperature solution such as a glycol solution at 30°F. it includes, alternatively and optionally, a heat sink filled with water, thereby having a freezing point temperature of about 32°F. In this type of arrangement an insulation layer 36 is provided between the permafrost and the thermocell thereby reducing the interface temperature between the permafrost soil and the system. Otherwise, a direct interface relationship between the thermocell and the permafrost soil would result in some melting of the adjacent permafrost soil which, over the years, could result in settling of the pipeline. The temperature drop through the insulation layer 36 reduces the interface temperature between the insulation layer 36 and permafrost soil 15 to less than 32°F. The insulation layer 36 may, in the winter time, slow down the dissipation of heat from the thermocell but this is not a great amount and is more than compensated by the fact that during the summer the heat flow from the natural environment is slowed to the thermocell 18.

Where the situation changes to one having a mean annual temperature of about 32°F., wherein the thawing index is substantially greater than the freezing index as, for example, at Valdez, Alaska, where the thawing index is about 3000 degree-days and the freezing index is only about 1500 degree-days, one can use a simple pipe insulation arrangement as shown for pipe section 11 in FIG. 2. The insulation in this instance, however, is for the opposite effect than that earlier described for the soil in this location is not permafrost. Here the insulation serves only to prevent the oil from cooling too significantly during the winter and causing significant desiccation and other variations in the adjacent soil.

So at both extremes of temperature, from that experienced, for example, at the North slope of Alaska to the Southern tip of Alaska, and corresponding other places of the world, such as found in Canada and Siberia and even certain latitudes in Japan and the United States, by applying combinations of insulated pipeline sections taught here, damage to the adjacent soil and to the pipeline can be prevented no matter what the weather.

In the embodiment of FIG. 5 a section 35 of insulation layer 17 can optionally be removed from adjacent the pipe 12 so that a hot spot is formed. This hot spot will accelerate the flow of cooling fluid, in this case air, about the annulus since it will be substantially warmer than the air from the atmosphere flowing through the annulus. The wide difference in temperature between the hot spot and the atmospheric air thus greatly accelerates heat dissipation. The hot spot however, is not so large as to exceed the capacity of the thermocell 18 adjacent thereto to absorb the heat escaping therefrom. This is an optional advantage which can be included where circumstances permit. Alternatively, a high heat conductive material (not shown), such as steel or aluminum could be located in open section 35 and extend upwardly adjacent the ground surface. By conductance the heat would flow through the pipe wall into the high conductance material acting as a thermal bleed dissipating the heat near the surface of the ground. To control where the major heat dissipation takes place, the high conductance material can be insulated such that the major heat loss takes place in the active surface layer of earth above the pipeline.

A variation of pipeline section 36 is that illustrated as section 40 in FIG. 6. One of the chief differences is that the outer layer comprising outer layers 42a and 42b are much like insulating layer 36 previously described, thermocell 44a and 44b are much like thermocell 18 previously described, and thermal bleed or ventilating annulus 46a and 46b, somewhat different from previously described annulus 28, are all bundled together in half cell units for ease of manufacture and installation. Since each of the half sections can be easily clamped, adhesively fastened or otherwise secured to each side of the pipe 12, each can be readily installed in the field as composite units of easily handled lengths and secured around the pipe 12 therealong. The insulation layer 17 remains the same as the previously described and is either formed about the pipe in the field or prior to assembly of the pipe itself in the same manner as for pipe section 11.

Ventilating annulus 46a and 46b differs from those previously described in that this is a closed heat dissipating system so therefore can be located entirely underground and can generally give better control since it is not subject to as great an extent to short term fluctuations in outside ambient temperatures. Annulus 46a and 46b can be filled with a particular saline or glycol solution 48, or its equivalent, which will not freeze at a desired temperature below 32°F. The internal circulation is dependent upon the thermal density change of the heat transfer media within the annulus. The core 45 of the annulus, of course, divides the annulus into inner and outer sections 47 and 49, respectively, and the flow of the heat transfer media, fluid 48, is along one side and back along the other side of the core. To facilitate this flow the core 45 should be perforated at either end or can be cut short on each end to permit flow about either end of the annulus 46a and 46b. During the winter, since the hotter part is adjacent the insulation layer 17, the media on this side (inside section 47) flows towards the top of the annulus section where, when it reaches ears 50a and 50b which are exposed to the cold permafrost soil 15, it is thereby densified, and then flows downwardly along outside section 49 past the thermocell and removes heat from the thermocell thereby regenerating its heat capacity for use in the summer. Since in the summer the density of fluid 48 is not increased at the ears 50 because of the warmer soil, flow substantially stops and therefore heat from the surface is not carried to the thermocell 44a and 44b.

To illustrate the actual effect of using the present invention in a permafrost region where a pipe section 16 such as that shown in FIG. 3 is employed under the following conditions and taking effect for the artificial constant heat produced by hot oil in the pipe and the variations due to the climatic natural solar heat or lack thereof during the various seasons of the year, the data being as set forth hereinbelow, the conditions were found by computer to be as shown in FIG. 7:

Climatology Data
Annual Mean Average Temperature                12°F.

Physical Data
Pipe Diameter                                  4'-0"
Crude Oil Temperature                          180°F.
Depth of Burial 1 - to centerline of pipe      6'-0"
Insulation thickness                           6"
   "K" factor - 0.24 BTU/ft²/hr/°F/in. thk.
Heat sink - 12" thk. annulus
   30°F. freezing point Soil Data
Thermal Diffusivity
   Melted                                      0.023 ft²/hr.
   Frozen                                      0.046 ft²/hr.
Latent Heat                                    21.6 BTU/lb
Density                                        118.6 bls/ft³
Soil Surface Temperature (T)
Variation with time (t) in days $$T = 12 + 36 \sin\left(\frac{2\pi t}{365} - 2.0\right)$$

The shaded areas, substantially the transverse darkened area at or near the top at each graphical representation, is the part of the soil which is at or above 32°F.

for the particular period covered. The non-darkened area of permafrost soil 15 is all below 32°F. The representations cover the months of June through November, for these are the only months in which it was found that thawing occurred. In the months December through May, it was found there was no thawed zone, the soil being completely frozen. As the summer progresses from June through September, the degree of thawing becomes greater. Then in October it was found that there is a double front wherein the thawed area is squeezed from both the top and the bottom since the colder air is cooling the surface 13 to a temperature below 32°F. The double front advances on the thawed area even more in November and in December completely eliminates the thawed area. It is quite evident from the representations of FIG. 9 that the effect of the heat from oil pipeline 10 on the soil in the area immediately adjacent the pipeline 10 is minimal at most and at no time was there found to be any noticeable thawing in the soil area immediately about the circumference of the pipe section 16.

In a more mild climatic condition where a thawing condition exists somewhere in the permafrost soil throughout the year, graphical representations of the effect of pipe section 26 as shown in FIG. 6, were found by computer to be as depicted in FIG. 8 with pertinent data being as follows:

Climatology Data
Annual Mean Average Temperature    30.6°F.

Physical Data
Pipe Diameter                       4'-0"
Crude Oil Temperature               180°F.
Depth of Burial - to centerline of pipe   7'-0"
Insulation thickness                6"
  "K" factor - 0.24 BTU/ft²hr/°F./in. thk.
Heat sink - 24" thk. annulus
  31°F. Freezing Point Soil Data
Thermal Diffusivity
  Melted                            0.023 ft²/hr.
  Frozen                            0.046 ft²/hr.
Latent Heat                         21.6 BTU/lb
Density                             118.6 lbs/ft³
Soil Surface Temperature (T)
Variation with Time (t) in days $$T = 30.6°F. + 36 \sin\left(\frac{2\pi t}{365} - 1.8\right)$$

Since there are thawed areas in the representations throughout the entire year the annual period is covered by FIG. 8 and the advance and the retreat of the thawed area in this case shown for every two month period, intermediate months generally showing a condition between the months on either side of it. The double front situation where the cold ambient air temperature is causing the freezing front to progress downwardly from the soil surface 13 to freeze and diminish the thawed area is shown by the January representation. As the winter progresses through March, the thawed area immediately adjacent the pipe substantially disappears and the other thawed areas are substantially diminished. Then as warmer weather comes along, as shown in the May representation, thawing from soil surface 13 again commences and the thawed area becomes progressively greater until colder weather again sets in as shown in the November representation and the double front condition starts anew. Again there is substantially no thawing of the permafrost immediately adjacent the pipe section 40 except at the very top thereof near the end of the warmer season where the thawed area normally progresses to the depth of the pipe section anyway. Again, it is quite clear from this representation that hot oil carried in the pipe line section has no adverse effect on the permafrost condition on the soil in which it is located.

While the present invention finds unique and extremely advantageous applications in an underground pipe line system some of its concepts may also be applied, with modification, to an above ground pipe line system, an example of which is shown in FIGS. 9 and 10. The pipe line 52 includes a pipe 54 carrying a fluid 56 above 32°F. and has an insulation cover 58. The pipe 54 is like the pipe 12, and the insulation cover 58 is like the insulation layer 17, previously described. In this case the pipe 54 is carried on a saddle 60 which has to be sufficient to carry the full weight of such a pipe section. The total weight of such a pipe and the oil therein would total about 1,250 lbs. per lineal foot of the pipe line 52. The pipe saddle 60 is carried on an insulation and heat absorbing and/or dissipating section 64 which includes an air duct 66, an insulation layer 68 and a thermocell heat sink 70, the details of which are better seen in FIG. 10. The entire pipe line supporting section 64 is located in a gravel bed 72 which acts as a leveling layer and rests upon the permafrost soil 74.

Referring now more particularly to FIG. 10, pipe saddle 60 can be supported on a bearing surface layer 76 such as might be formed from a high density polyethylene plastic material to permit some shifting between the saddle 60 and supporting section 64, due to subtle shifts of the soil and otherwise, without disturbing the disposition of the pipe line 52. The air duct 66 has a core 78 and skins 80 substantially like those shown for the thermocell 18 of FIG. 4 only laid out flat. Foam insulation layer 68 can be formed of the same material as the insulation layer 18 of FIG. 4 only laid out flat. One such insulation material can be closed cell polystyrene foam, like Styrofoam brand expanded polystyrene produced by The Dow Chemical Company. In thermocell 70, the core 84, skins 86 and fluid 90 are like the corresponding core 22, skins 20 and fluid 24 shown in FIG. 4 all of which components are flat rather than curved but function in like manner. In the winter time the cold air passing through the duct 66 keeps heat from the pipe away from the permafrost soil 74. In the summer, the insulation layer 68 protects the permafrost soil 74 from the heat generated by both the pipeline 52 and from the solar heat. Thermocell 70 in the summertime stores heat that passes through the insulation layer 68 preventing such heat from going through the gravel layer 72 and into the permafrost soil 74. During the winter months, of course, the thermocell 70 is regenerated and heat is removed due to the cold air moving through the air duct 66 and the generally cold conditions in the surrounding atmosphere.

In some instances where a heated material flows through a pipeline or the like, such as heated oil traveling through the line, the flow friction generated by the passage of the liquid increases the temperature of the already heated fluid. For example, heated oil which initially enters the pipeline well above 32°F. may be increased in temperature by several degrees in traveling just a relatively short distance through the line. Since it is desirable to maintain the oil at a constant temperature so that proper flow is obtained, no phase change occurs and the metal of the pipe is not subjected to unwanted temperature variations, it is therefore a desirable objective to dump the excess heat generated by the flow friction to the atmosphere.

Figure 11:
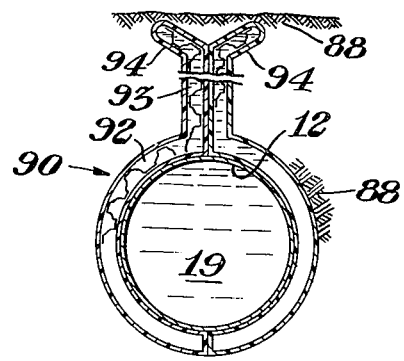

In a zone where there is earth which is not particularly disturbed by increases in its temperature, it has been found possible to accomplish the immediately preceeding desired objective by employing a thermal bleed only about the periphery of such a pipeline, as illustrated in FIG. 11, buried, supported on rock or otherwise located adjacent such substantially non-heat effected earth. Here in section 90, pipeline 12 carries a fluid 19, usually at a temperature above 32°F., when flowing, and is surrounded around its periphery by a thernal bleed 92. Thermal bleed 92 is preferably like in structure, with skins and core providing dual internal passageways, to the thermal bleed 46A and 46B previously described with respect to FIG. 6, and includes ears 94 to dissipate the heat to the surrounding earth and/or atmosphere. The fluid 93 (like liquid 24) within the thermal bleed 92 flows upwardly along the passageway of the core, which can be insulated, adjacent the heated pipeline 19 and back downwardly along the passageway outside of the core as it cools in a manner not unlike the previously described but in this case for the primary purpose of dumping the excess heat generated by flow friction of the fluid with the pipeline, but also to reduce the temperature of fluid 19 when desired. The freezing point of the fluid 93 can be selected so that its freezing point is not below the temperature at which the fluid 19 will effectively commence flowing, in the event the line shuts down and the fluid 19 becomes cooled.

Figure 12:
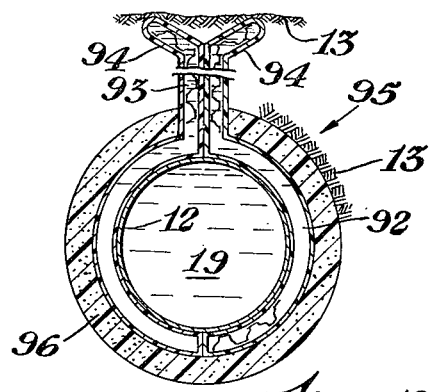
Figure 13:
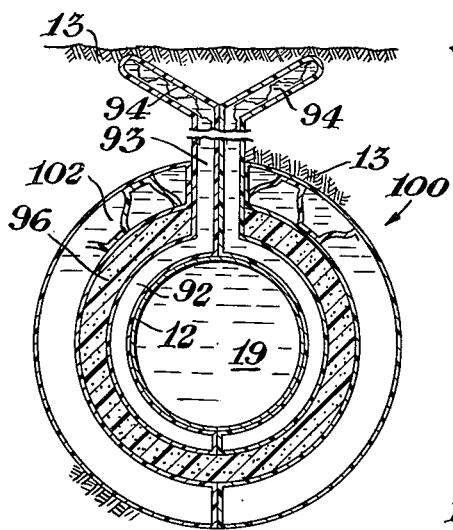
Figure 14:
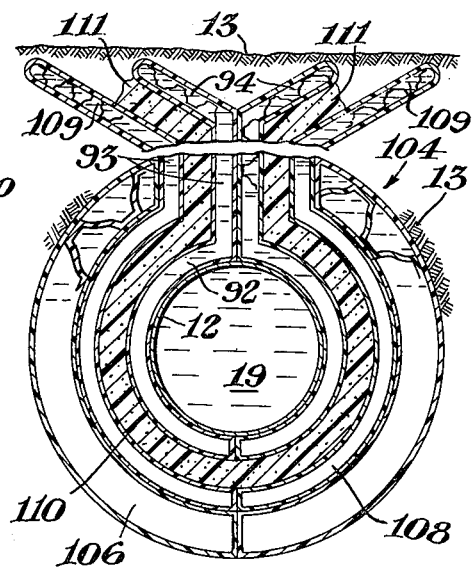

Modified section 95 of FIG. 12 is like FIG. 11 only includes a blanket of insulation 96 like layer 17 previously described, about the thermal bleed 92. This section 95, as are the following sections 100 and 105 of FIGS. 13 and 14 are particularly adapted for permafrost regions where heat can disturb the permafrost support. The particular permafrost region for which the structure of FIG. 12 is adapted is for that where there is extremely cold prolonged winter seasons such as that experienced near the North slope of Alaska. The thermal bleed 92 in this case again provides for maintenance of the oil at a desirable temperature, by permitting bleed-off of the excess heat occasioned by flow friction. With the insulation 96 there is created freezing point interface between the pipeline 12 and the permafrost such that there is substantially no melting of the permafrost. Again this is only applicable where the freezing conditions are extreme and the permafrost therefore has an especially high heat sink capacity, to absorb any flow through of heat through the insulation.

In a location where the winter season is not so severe such that the heat sink capacity of the permafrost is less than that desirable for the section 95, the section 100 of FIG. 13 is recommended. The functions of comparable elements of section 100 are like those of section FIG. 12, and like components have like reference numerals. In addition, a heat sink or thermocell 102, is employed to absorb excess heat which may come through the insulation layer 96. The thermocell 102 stores this heat until the wintertime when it is transmitted through the permafrost into the atmosphere. The structure and components of thermocell 102 can be the same as those of the thermocell 18. Again, the thermal bleed 92 acts to remove excess heat from the fluid 19 to maintain it at the desired temperature.

Section 104 illustrated in FIG. 14 includes heat sink thermocell 106, thermal bleed 108 and insulation layer 110 which are comparable respectively to thermocell 18, thermal bleed 28 and insulation layer 17 of section 26 of FIG. 4 respectively; with the exception that there is also included a thermal bleed 112 between the insulation layer 110 and pipe 12, and the insulation layer has extensions 111 separating the upper portions of the two thermal bleeds. The function of the thermal bleed 112 as shown in FIG. 14, is to remove excess heat from the pipe, which may be generated from the friction due to the fluid flow so as to maintain the heated product 19 at the desired temperature. This section 104 is therefor adapted to the same general situation as the section 26, but where the heat generated by friction is especially above desired levels. The thermal bleed 92 works year around to remove heat from the fluid 19, but the thermal bleed 108 works principally only in the winter months to accomplish regeneration of the thermocell 106. In the winter the thermocell 106 therefore readily dumps its excess heat into the thermally active soil layer thereabove and thus to the atmosphere through ears 109 of thermal bleed 108 so that the amount of excess heat dumped into the adjacent permafrost is within its capacity then to receive the heat without melting. Because of this difference in function it is best to maintain the thermal bleeds 108 and 112 insulated from one another as by extension 111 between ears 94 and 109. Thus the present invention can provide for dumping of the excess heat of the heated fluid 19 in a pipeline or the like and protect the permafrost simultaneously.

Another source of generally constant heat which can affect permafrost support is that which is encountered in heated buildings and the like. When a building is built over permafrost and, although insulated under the footings and floors, the lack of 100 percent insulation efficiency allows heat to flow to the permafrost causing melting, and settlement of the building. The basic problem is that the area covered by the building is no longer subject to the cyclic climatic conditions and the subsurface of the ground is not refrozen during the winter period. A typical method of construction used at the present time is to build the building on piling leaving an air space below the building. This method, however, has its drawbacks. One is boring the holes in the permafrost to set the piles in and secondly the piles are jacked out of the ground causing the building to tilt. The jacking is caused by the cyclic temperature variations whereby freezing and thawing of the subsurface takes place causing a vertical thrust movement on the piling. While often such heave is minimized by the depth of embedment of the pile in the permafrost, oftentimes this is not achieved. There are so many variables that results are very uncertain.

The present invention provides a way of building such structures without using piling and yet takes advantage of the cyclical climatic conditions to refreeze the subsoil under a building following a summer thaw. One embodiment of the present invention is that illustrated in FIG. 15 wherein a building 120 is located on a foundation slab 122 which can be comprised of concrete or the like. Underneath the slab 122 is an insulation layer 124 which can be comprised of the same materials as insulation layer 68 of FIGS. 9 and 10. Below insulation layer 124 is a thermobleed or air duct 126 which can be constructed just like the air duct 66 in FIGS. 9 and 10, and permit passage both ways therethrough to dissipate heat which may pass through the insulation layer 124. Preferably located below the thermal bleed 126 is ground insulation layer 128 which layer can be substantially like the layer 124. Below the insulation layer 128 can be located a heat sink or thermocell 130 which is substantially like thermocell 70 of FIGS. 9 and 10. The entire foundation section comprising a section of slab 122 through thermocell 130 preferably rests upon a gravel layer 132 or its equivalent, which in turn is supported upon permafrost 134.

In operation, the foundation of FIG. 15 operates much like pipe saddle support section 64. By interposing of thermal bleed 126 between the two insulation layers 124 and 128 of a properly selected thermal resistance, the heat flow to the permafrost 134 is controlled such that the permafrost does not melt. The air flow throughout the thermal bleed 126 under winter climatic conditions removes the heat flow through the floor insulation 124 as well as removing the heat from the permafrost heat sink. The winter cycle, being of longer duration than the summer cycle, has ample time to refreeze and supercool the permafrost soil. Thus, the heat thermal cell 130 is reestablished and ready for the next summer cycle.

For example, if the insulation layer 128 is selected such that thermal resistance allows from one BTU to two BTU heat flow per square foot per hour during a summer climatic cycle of 135 days, this heat can be absorbed in 22 to 44 pounds of sodium sulfate solution or its equilvalent in thermocell 130. This is based just on the heat of fusion of the solution at 144 BTU per pound at 29°F., neglecting any latent heat and volumetric heat available in the permafrost 134.

Yet another embodiment of the present invention is illustrated in FIG. 16 which is also adapted for a much larger heated building or other structure, perhaps an oil well production platform, which presents greater heat flow problems than that comprehended for the modification of FIG. 15. The foundation 138, while it can be like something else can also be much like the foundation 122. Other like reference characters have been used to designate similar portions between FIGS. 15 and 16. The main difference here is the substitution of two phase thermal bleed 140 for the simpler air duct thermal bleed 126. Thermal bleed 140 can be built like thermal cell 130 but is filled with a two phase heat transfer fluid 141, like a methyl bromide/methyl chloride mixture solution, having a boiling point, for example, of 20°F. to 32°F. at 760 mm. of mercury. Other suitable fluids for use in the present invention are materials such as dichlorodifluoromethane, sulfur dioxide, ethylchloride, trichlorofluoromethane, a 1:1 mixture of methyl bromide and methylchloride. Beneficially be employing such liquids the pressure within the thermal bleed can be maintained from about 5–25 pounds per square inch absolute and pressure equipment avoided. This fluid can be filled to about half the level of thermal bleed 140. The thermal bleed 140 is connected via a tubular system 141 with a heat exchanger 142 by an upper flow passage 144 in open communication with the upper non-liquiid part of thermal bleed 140 and by lower passageway 146 in open communication with the lower fluid filled portion of thermal bleed 140 for return of the condensed fluid. The heat exchanger is filled about tubular system 141 with a heat sink solution 143 which solution should have a freezing (phase change) point below the boiling point of two phase heat transfer fluid, or with cryogenic liquid or fluid cooled by mechanical refrigeration. Extending out from heat exchanger 142 are condenser elements 148 in open communication with tubular system 141. An optional heat exchanger bypass line 145 can be used for winter operations, by operation of a two-way valve. In order to maintain a pressure system no greater than one atmosphere, a vent 150 for exhausting gases from tubular system 141 can form part of the condenser system 148 so the components need not be designed to take high pressures without failure.

The two phase fluid 14 in the thermal bleed 140 boils at a temperature greater than that of the heat exchanger 142 so that when solar heat is absorbed the phase changes and the gas passes through passage 144 to the heat exchanger 142 in the summer months. Since the heat sink solution 143 has a phase change temperature, solid to liquid, lower than the boiled off gas, heat is absorbed from the gas with the result that the gas condenses and returns to the thermal bleed as a liquid. The heat exchanger thus works as a condenser during the summer months. During the winter months the gas passes through the heat exchanger into the condenser elements 148 where the cold air around the condenser elements 148 absorbs heat from the gas, resulting in condensation of the gas and its return to the thermal bleed 140 via passageway 146.

The present invention also comprehends the carrying of cryogenic liquids or gaseous liquids, such as a liquified natural gas which can have temperatures from, for example, −50° to −300°F. to maintain their liquified or semi-liquified state for high volume rapid transport. Application of the concept as applied to cryogenics can be that, for example, where a gas 159 such as liquid nitrogen is transported through an underground pipeline. Such a pipeline adapted according to this invention for carrying such cryogenic materials is represented by section 160 of FIG. 17 wherein as a specific example, a metallic pipe 162 (like pipe 12 of FIG. 2) only having a radius of 1½ ft. can include 5¼ in. insulating layer 164 (like the layer 17 of FIG. 2) a thermocell or heat sink 166 (like the heat sink 24 in FIG. 3) and a 3 in. insulation layer 168 (like layer 36 in FIG. 5) which pipe section can likewise be located at a depth of about six feet from the surface of the ground to the centerline of the pipe 162.

This application of the invention to cryogenics is particularly adaptable to permafrost regions but is not limited thereto because the liquification temperature for most gases which could be involved is so low, like −256° for nitrogen gas, that whether the soil is below 32° or above does not involve more than altering the capacity of the system to achieve the desired end. That desired end is to maintain a constant temperature difference at the interface between the insulation layer 164 and the thermocell 166. Were there only an insulation layer of reasonable thickness about the pipeline the temperature difference between the liquified gas and the outside of the insulation layer would be cyclical, depending on the climatic heat gain or loss in the surrounding ground areas. For a cryogenic pipeline it is necessary to periodically bring the gas above ground for refrigeration and repump the gas into the line to maintain the liquification temperature. Thus, when the gas begins to approach that temperature, it is again refrigerated to several degrees below the liquification temperatures. The prior art pipelines have been designed for the maximum heat exchange in such a design as represented by the sinusoidal curve 168 indicated in FIG. 18, reflecting the seasonal variations in temperature. By so designing for the maximum condition, the pipe also has to be capable of withstanding the minimum condition which can result in the use of especially expensive materials so that brittleness of the material does not cause a failure at the minimum condition. Also with the sinusoidal effect the pipe is subject to constant expansion and contraction which requires more expensive pipe, or there can be a high risk of pipe failure.

By the present invention the sinusoidal effect can be dampered to a substantially straight line effect such as illustrated by the substantially straight line 170 in FIG. 18. Thus, the relative difference between the liquid and its interface with its exterior environment can be constant as, for example, the heat sink can be designed to about −60°F. (or some other reasonable temperature which can be selected from suitable eutectic solution) for liquid nitrogen which should be kept at temperatures of about −256°F. or lower. Over designing and relatively expensive material are thus aleviated and the pumping and refrigeration stations can be spaced a greater distance from one another by maintaining such a constant difference. For example, with a pipeline as shown and described with respect to FIG. 17 wherein the K factor of the insulation of 0.24 BTU/hr/sq.ft/degree F./inch thickness, and the following other conditions are present:

Surface temperature = 40°F. + 30 sin $\left(\frac{2\pi t}{365} - 1.8\right)$
Heat sink temperature = −60°F.
Pipe temperature = −256°F.
Thermal conductivity of soil = 0.822 BTU/hr.ft°F.
Heat capacity of soil = 0.3 BTU/lb.°F.
Density of soil = 118.6 lb/ft.$^3$
Capacity of heat sink = 5.6 × 10$^4$ BTU/ft.

It has been determined by mathematical analysis that there is a constant flow from the pipe to the heat sink of 93.8 BTU per hour per foot of pipe while there is a sinusoidal transfer of heat from the ground to the heat sink with a net flow of 5.6 × 10$^4$ BTU per foot of pipe over a period of one year. A similar pipe having only a layer of about 9 in. of like insulation therearound would have on the other hand a maximum variation throughout the year of 37 BTU per hour per foot of pipe (approximately 95 to 132 BTU difference) as compared to the constant 93.8 BTU present with this particular embodiment of the present invention.

While certain representative embodiments and details have been shown for the purpose of illustrating the invention, it will be apparent to those skilled in the art that various changes and modifications can be made therein without departing from the spirit and scope of the invention. For example, various combinations of heat sink, insulation layers, and/or thermal bleed elements described hereinabove can satisfy special applications not specifically mentioned above and still come within the scope of this invention as claimed. Likewise, the elements hereof can take different shapes or parts of shapes or involve other components or combinations of components other than as specifically described in the preferred embodiments hereof. Specifically, the elements might extend only partially between the member and the environment and non-frost susceptible granular or other material might be employed adjacent the remaining portions of said member in appropriate circumstances. Additionally, the lines might have various other uses than as above mentioned, as for example, carrying utilities such as electric or telephone cables where it is desired to maintain a relatively stable temperature within the lines despite the environment.

Accordingly, what is claimed is:

1. An arrangement of elements located between an earthen support and a member maintained or adapted to be maintained at a temperature different than that of its adjacent earthen support, one of said elements comprising a layer of insulation material, another of said elements comprising a closed cell structure including a given contained fluid means for storing excess quantities of heat during a warm climatic season and dissipating the same during a cold climatic season thereby permitting the heat storage capacity of said means to be naturally regenerative by climatic seasonal changes, said elements thereby maintaining a relatively controlled temperature differential between said member and said earthen support.

2. The arrangement of claim 1 wherein said means includes a thermal bleed immediately adjacent said member.

3. The arrangement of claim 2 wherein said thermal bleed comprises a closed cell with an internal dual passageway and including a thermally sensitive fluid which can move through said passageway to carry heat away from said member.

4. The arrangement of claim 2 wherein said means further includes a heat sink located on the side of said insulation layer opposite from said thermal bleed.

5. The arrangement of claim 4 wherein said means still further includes a second thermal bleed between said heat sink and said insulation layer to assist said heat sink in preventing heat from reaching said earthen support during the summer season and to regenerate the heat sink during the winter season.

6. The arrangement of claim 1 wherein said means includes a heat sink of sufficient capacity to maintain a relatively constant temperature differential between said member and said elements despite cyclic climatic variances in said earthen support.

7. The arrangement of claim 6 wherein said insulation layer is between said heat sink and said member.

8. The arrangement of claim 7 wherein a second insulation layer is located between said heat sink and said earthen support.

9. The arrangement of claim 7 wherein said heat sink has a transition temperature below that of said earthen support.

10. An arrangement of claim 1, wherein the temperature of said member is below that of its adjacent earthen support.

* * * * *